United States Patent

Blaum et al.

[11] Patent Number: 6,141,176
[45] Date of Patent: Oct. 31, 2000

[54] DATA STORAGE DISK WITH INFORMATION ENCODED IN THE POSITION ERROR SIGNAL FIELDS

[75] Inventors: Mario Blaum, San Jose; William John Kabelac, Morgan Hill; Louis Joseph Serrano; Mantle Man-Hon Yu, both of San Jose, all of Calif.

[73] Assignee: International Business Machines Corporation, Armonk, N.Y.

[21] Appl. No.: 09/098,169

[22] Filed: Jun. 16, 1998

[51] Int. Cl.⁷ ..................................................... G11B 5/596
[52] U.S. Cl. ..................................... 360/77.08; 360/78.14; 360/75
[58] Field of Search .............................. 360/77.08, 78.14, 360/77.05, 77.07, 78.04, 75, 48, 40, 53

[56] References Cited

U.S. PATENT DOCUMENTS

| | | | |
|---|---|---|---|
| 4,195,320 | 3/1980 | Andresen | 360/78 |
| 4,669,004 | 5/1987 | Moon et al. | 360/77 |
| 4,783,705 | 11/1988 | Moon et al. | 360/77 |
| 5,210,660 | 5/1993 | Hetzler | 360/51 |
| 5,369,535 | 11/1994 | Hetzler | 360/78.14 |
| 5,500,848 | 3/1996 | Best et al. | 369/275.3 |
| 5,608,587 | 3/1997 | Smith | 360/77.08 |
| 5,796,543 | 8/1998 | Ton-That | 360/77.08 |
| 5,801,897 | 9/1998 | Kanda et al. | 360/77.08 X |

FOREIGN PATENT DOCUMENTS

| | | |
|---|---|---|
| 64-23477 | 7/1987 | Japan . |
| 4-302864 | 3/1991 | Japan . |

OTHER PUBLICATIONS

IBM TDB, vol. 33, No. 3B, Aug. 1990, "Quad Burst Servo Needing No Sync ID and Having Added Information", pp. 198–200.

USPTO Serial No. 08/628,217, "Disk Drive Servo Sensing Gain Normalization and Linerization", pending.

Lin et al., "Error Control Coding", Prentice Hall, Inc., copyright 1983, pp. 167–177.

IBM TDB, vol. 32, No. 6A, Nov. 1989, "Digital Encoding Scheme With Error Detection". Pp. 275–276.

IBM TDB. vol. 29, No. 8, Jan. 1987, "Disk File Phase-Encoded Sector Servo Pattern With Data and Reference Fields in Each Sector". Pp. 3697–3699.

*Primary Examiner*—Muhammad Edun
*Attorney, Agent, or Firm*—G. Marlin Knight

[57] ABSTRACT

There is disclosed a disk for use in a disk drive and a method for making the disk. The position error signal (PES) fields for each track on the disk are written with predetermined data, e.g. servo data, encoded thereon. In the preferred embodiment: a) the data such as the track number is mapped into codewords of an error correction code (ECC); b) bit-vectors are used to encode the symbols for further redundancy; and c) the raw data written in the PES fields is constrained to equalize the analog signal characteristic used by the servo system for positioning. Thus, the invention allows the PES fields to be used as in the prior art while also being used as a source of digital data which is robustly recorded therein. In one aspect of the invention, the track ID's are written in the PES fields in a selected pattern in which the track ID for each track is recorded in two PES field groups. One of the two PES field groups is centered on the selected track while the other PES field group is offset so that it partially overlaps the adjacent track, as well as the selected track. The PES fields will typically be recorded on the disk at the time of manufacture and not changed thereafter.

16 Claims, 7 Drawing Sheets

DATA STORAGE DISK WITH INFORMATION ENCODED IN THE POSITION ERROR SIGNAL FIELDS

CROSS REFERENCE TO RELATED APPLICATION

U.S. patent application docket number SA9-97-012, entitled "DISK DRIVE WITH INFORMATION ENCODED IN THE POSITION ERROR SIGNAL FIELDS", with common inventors and commonly assigned was filed concurrently with this application. A serial number will be provided when available. Commonly assigned U.S. patent application bearing Ser. No. 08/813,775 entitled "METHOD AND APPARATUS FOR ENCODING DIGITAL SERVO INFORMATION IN A SERVO BURST" filed Mar. 7, 1997 is also related to the present application and is hereby incorporated by reference.

FIELD OF THE INVENTION

This invention relates to data storage devices such as a disk drive, and more particularly to error detection and correction of servo system data encoded in position error signals on the disk.

DESCRIPTION OF RELATED ART

A disk drive typically includes one or more disks and a head (for each disk surface) mounted on an actuator which is positionable over a selected one of the tracks on the rotating disk. A voice coil motor (VCM) is commonly used to position the actuator on which the sliders containing the heads are mounted. The slider moves either radially or arcuately toward or away from the spindle center of the rotating disk while trying to find or "seek" to a target track. For any selected track, data is recorded upon the track via a "write path" in the system. Alternatively, data is read from the track via a "read path".

The positioning of the slider is typically controlled by a closed loop servo system. The servo is operative both in placing the read and/or write transducers (heads) over a target track initially (SEEKING) and in assuring that the appropriate transducer is following the track while the data is being read or written (TRACK FOLLOWING). A portion of each disk track is formatted to include at least one and typically several servo fields to allow the servo system to update its head position several times during each revolution. Each servo field is further formatted to include servo data including position error signals (PESs). The PES fields are conventionally bursts of constant amplitude sinusoidal signals which are of equal length and are spaced at fixed intervals. These fields are used to generate analog signals which vary with the position of the read head and allow the precise positioning of the heads over the track. The PES typically consists of three or four staggered bursts of transitions, for example, an A, B, C and D burst. If the measured amplitude of the bursts indicates that the head is not in position, then a control signal is generated to the VCM to adjust the position. A servo system typically includes a servo processor which controls the VCM and monitors the servo data being read from the disk.

One way of organizing disk storage tracks is to divide a track into data sectors, a data sector being a fixed number of bits recorded along the track. The servo data and PES information are typically located along radially arcing lines, but in the commonly used "zone bit recording" (ZBR) method the number and position of the data sectors varies according to the distance that the track is from the center of the disk. (See for example, Hetzler, et al. U.S. Pat. No. 5,210,660). Usually, there are several servo sectors per track. This results in at least some of the servo sectors being located inside data sectors forming a so-called "split data field." The servo sectors include the PES and servo data including track identification (TID) and other control information.

Conventionally each track has its unique track identity (TID), i.e. the track address, magnetically recorded in the servo data. During a SEEK, while moving radially inward or outward, the servo system reads the TIDs from the servo sectors on a track. The TIDs tell the servo system where the head is at that moment and allows the system adjust its velocity, etc., to navigate to the target track.

A typical prior art format used on servo sectors comprises the following fields:

—||Rd/Wr|AGC"SID|TID|Hd"Cyl|PES||—.

In this format, the SID (Servo ID) character consists of a timing line or mark and locates the beginning of servo sector position information on the track. The TID (track identity) character is typically expressed as a codeword in a reflected binary (also called a "Gray" code). The virtue of a Gray code is that the TID number varies from track to track by only one digit. This assists robust reading of TIDs even when offtrack as occurs during rapid seeking. HD (head) and CYL (cylinder) fields may provide other information.

In the prior art, there have been suggestions for enriching the PES-stored information. Cunningham, "Quad Burst Servo Needing No Sync ID and Having Added Information", *IBM Technical Disclosure Bulletin*, Vol. 33, No. 3B, pp. 198–200, August 1990, describes a quad burst servo pattern in which approximately 8 bits of information can be encoded in the PES burst by phase manipulation of the fundamental sinusoidal frequency which is used by the servo system. However, the phase method results in a loss of amplitude for normal servo detection. The information can include data unique to each burst identifying it as A, B, C or D, for example by using two bits, as well as some of the lower order bits of the track or sector number.

Similarly, Andresen, U.S. Pat. No. 4,195,320, "Record Track Identification and Following", issued Mar. 25, 1980, discloses a servo system for a floppy disk which uses track address information digitally encoded in servo bursts using a sliding modulo code and also integrates the signals to obtain an analog measure of the read transducer's position in relation to the track.

While enrichment of PES fields and the like in the servo sector can result in enhanced device access performance, it renders the accurate positioning of the head/transducer over the target track vulnerable where the servo sector information is susceptible to corruption by error or erasure. The corruption may occur randomly or intermittently. The sources may be induced noise, phase jitter, or the like.

SUMMARY OF THE INVENTION

A data storage system with an improved servo system and an improved disk, as well as, a method of recording and retrieving servo information with protection from errors is described herein. The method of the invention involves mapping the predetermined data, e.g. servo data, into codewords with redundancy information such as in an error correction code (ECC) and then recording these codewords into the PES fields. The PES fields will typically be recorded on the disk at the time of manufacture and will not be changed thereafter. The preferred ECC encoding method is selected to maintain analog signal characteristics regardless of the data stored in the PES, so that minimal, if any, change in the conventional servo detection circuitry is needed use the PES bursts as in the prior art, as well as, sources of digital data. Thus, the codewords of the ECC are constrained in the allowed weights, e.g., the number of 1's in each codeword (or magnetic transitions), and run-length-limited (RLL) attributes.

In a preferred embodiment the servo data mapped into the ECC codewords includes track identification (TID) which can be represented by a fixed number of bits of information. The bits are converted into one or more ECC codewords. Additional constraints such as equal weight are placed on the code by mapping the data comprising the TID into limited set of bit patterns (bit-vectors). If disallowed bit patterns are read back, then an error is detected independently from the ECC syndrome calculation process. Placing the TID information in the PES fields using the robust method of the invention optionally allows the conventional TID field in the servo data to be reduced in size or eliminated with a resulting increase in recording capacity. Although various types of ECC algorithms can be used, either a Reed-Solomon type ECC or a Hamming type ECC are preferred.

In one aspect of the invention, the track ID's are written in the PES fields in a selected pattern in which the track ID for each track is recorded in more than one PES field in more than one group of PES fields. One group of PES fields is centered on the selected track while the other group of PES fields is offset so that it partially overlaps the adjacent track, as well as the selected track. When the drive is operating, the previously recorded ECC codewords in one or more of the PES signals is read and the constrained symbols and the ECC codewords are used to ascertain the presence of errors. If errors are found, correction can be performed up to the limit of the selected code. The corrections are made by computing the syndromes as in ECC prior art. This gives an estimate of the servo data that includes the TID. The TID used in conjunction with the waveforms induced in the read head by the PES gives a precise measure of the position of the head on the disk.

DESCRIPTION OF THE PREFERRED EMBODIMENT

The embodiment described below is merely illustrative and is not intended to be limiting, the latter being the function of the claims appending the specification.

Figure 1:
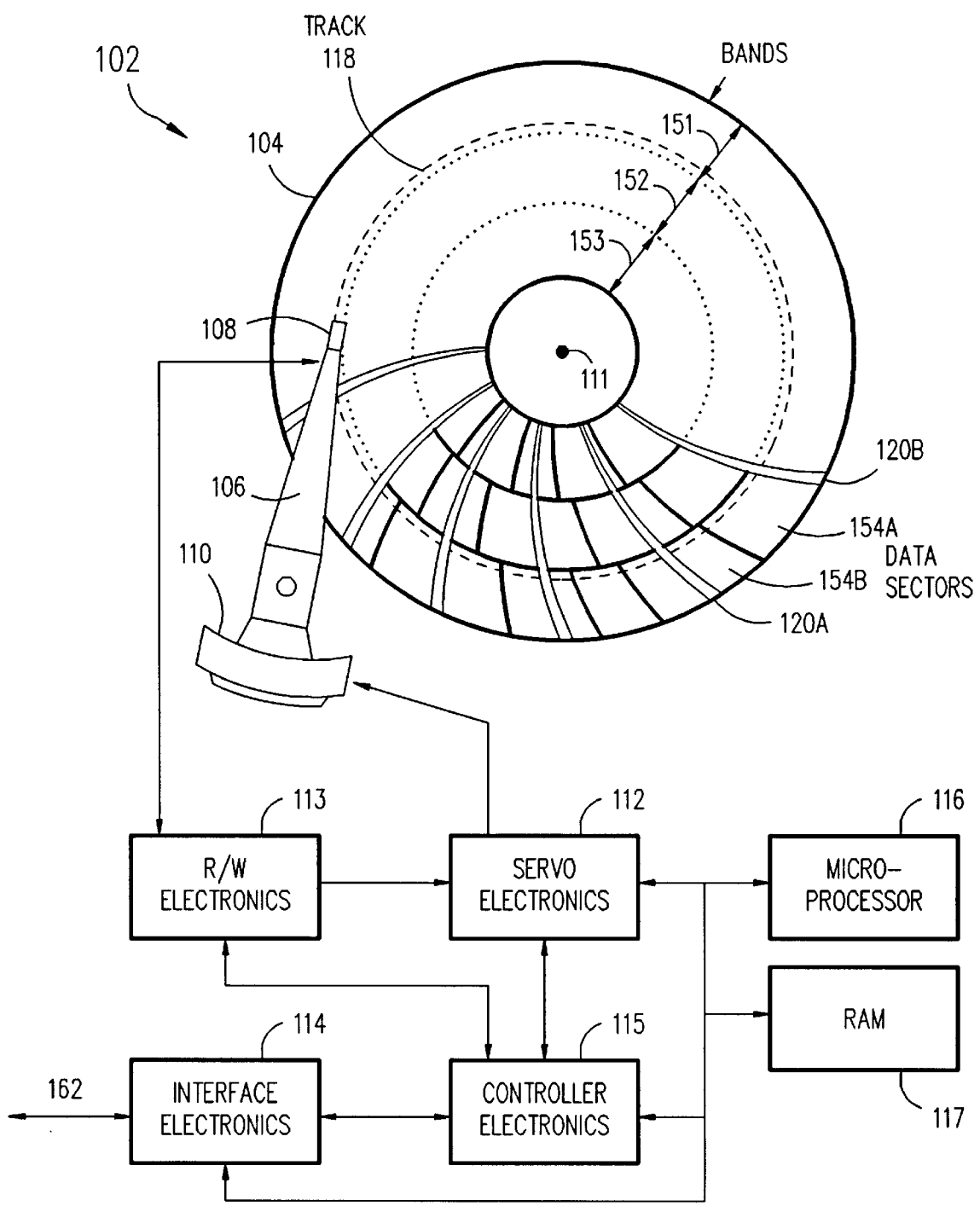
FIG. 1 depicts a block diagram of a disk drive expressing the major data flow and control flow therein according to the prior art.

Referring now to FIG. 1, there is shown a simplified block diagram of a disk drive illustrating the major components, data flow and control flow therein according to the prior art. A modem disk drive may have one or more microprocessors controlling various functions. FIG. 1 shows a design with a single microprocessor 116. The program for the microprocessor is commonly called the firmware. Commands and data for the drive come in from a host device (not shown) via path 162 into the interface electronics 114, where the host level commands are translated into device level commands and actions. The controller electronics 115 coordinates activities and data flow to and from the Read/Write (R/W) Electronics 113. The Servo Electronics 112 (which typically includes a servo processor) receives raw position information from the read head(s) 108, including the signal induced by the PES bursts and the signal corresponding to the TID, then controls the movement of the actuator 106 through electrical signals sent to the voice coil motor (VCM) 110. The heads 108 are mounted on the end of the actuator 106. The disk 104 is rotated by a spindle motor (not shown) around spindle 111. The slightly arcing servo sectors 120A, 120B contain the servo data and PES bursts. The data is written in circular tracks 118 on the planar surface disk. The tracks are divided into data sectors 154A, 154B where the user or customer data is stored.

The R/W Electronics perform the basic demodulation and detection decisions on the raw data signals from the read heads and convert these signals into binary data (a stream of 1's and 0's). The raw data signals written onto the disk are constrained according to schemes such as run-length limited (RLL) coding which enhance the ability of the system to accurately read the data back. The converted binary data are stored in a buffer (not shown). At this stage the data in the buffer includes redundancy information typically called ECC check bytes or symbols. The ECC check bytes together with the true data (typically called host or customer data) bytes form ECC codewords. The ECC detection and correction hardware and or firmware is commonly considered to be a controller function. When no errors are found or when the errors have been corrected, the customer data is sent to the host without the ECC bytes. It should be noted that the servo related information, i.e., the TID and burst signals are not typically sent to the host.

The disk 104 has a thin film magnetic coating which allows the servo information and the raw data to be stored as magnetic transitions. The servo sector data 120A–B are typically written in arcing radial lines at regular radial (angular) positions around the disk. For purposes of this invention, a sector is defined as a fixed recording length along a track. For instance, a typical data sector might be 512 bytes in length. The data sectors 154A, 154B are placed somewhat independently of the servo sectors, so that there may be multiple data sectors between two servo sectors and servo sectors may fall in the middle of a data sector forming what are called split data fields, e.g. 154B. If the tracks of a disk are formatted under ZBR as mentioned in the Hetzler '660 patent, then tracks in outer zones 151, 152 would have more data sectors between servo sectors than the tracks in inner zones 153. Although only three zones are shown in FIG. 1, there is no arbitrary limit on the number of zones.

Figure 7:
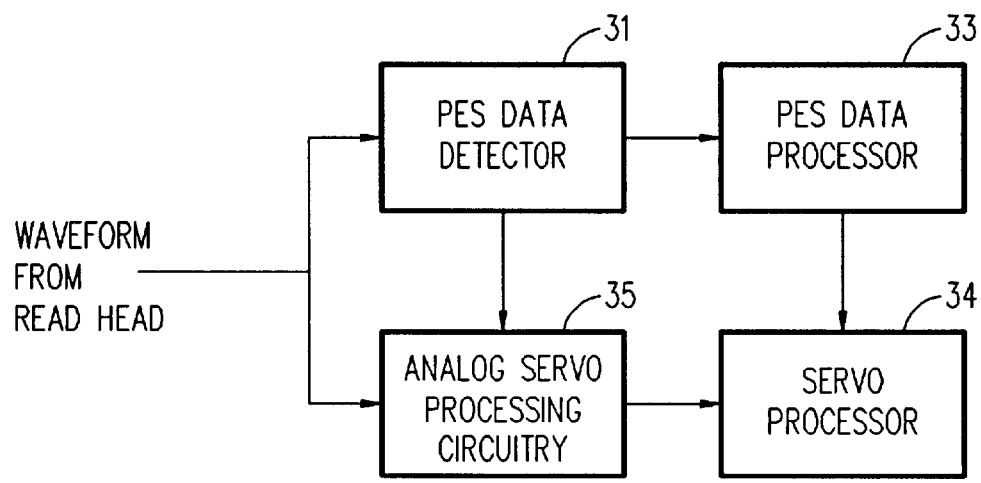
FIG. 7 is a block diagram showing a PES data detector and PES data processor in relation to other servo system components.

FIG. 7 is a block diagram showing a PES data detector and PES data processor in relation to analog servo processing circuitry and a servo processor that illustrates the signal and data flow at a high level in a disk drive embodying the invention. The waveforms from the read head which are induced by the PES bursts are processed in two parallel paths. The waveforms can be processed as in the prior art by analog servo processing circuitry 35 which uses the relative analog signal strengths induced by the bursts to provides information to the servo processor 34 on the position of the head in relation to a track. In addition to the analog processing, the waveforms are converted by the PES data detector 31 into raw binary data. The binary data is then processed to recover the track ID (and any other information encoded into the PES fields) by the PES data processor 33. The track ID information, etc., is then provided to the servo processor 34 for use in controlling and adjusting the position of the heads, e.g. seeking and track following.

Figure 2A:
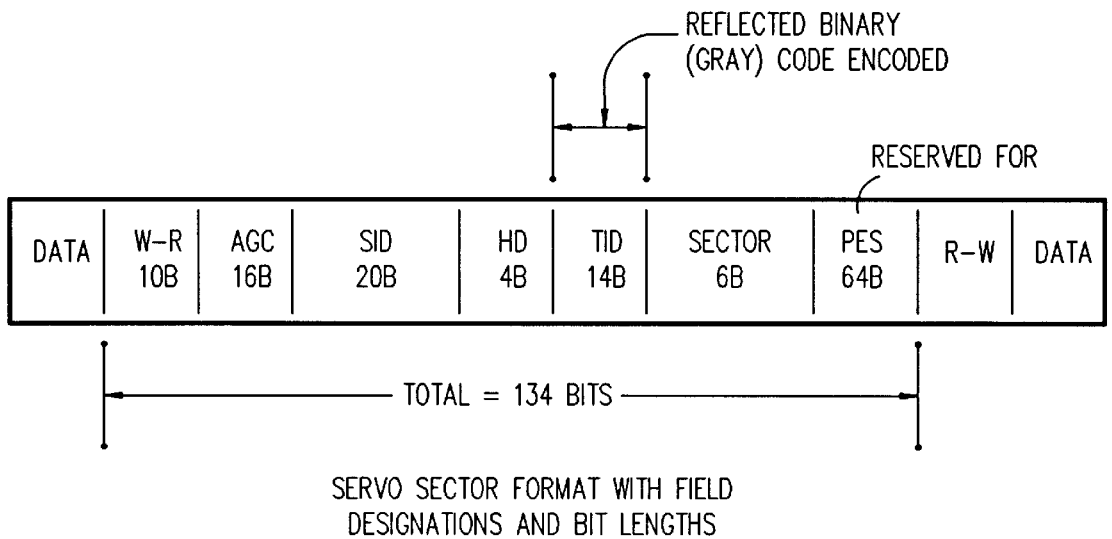
FIG. 2A shows a typical prior art servo sector format with field designations and bit lengths.

The invention is independent of the servo data architecture, but for better understanding of the invention and not to imply limitation, a prior art servo sector format will be compared to an embodiment of the invention. There is shown in FIG. 2A a typical prior art servo sector format with field designations and equivalent bit lengths. The total length of the servo sector is 134 bits and it is partitioned into seven fields. The effective length is only 124 bits since the W/R field is not pertinent to positioning information. The SID (Servo ID) field consists of a unique bit pattern and marks the start of the servo sector proper. Of the next three fields; namely, HD (Head), TID (Track Identity), and SECTOR, the TID is the most critical since it identifies the track. The SECTOR and HD provide ancillary positioning data. The practice has been to encode just the TID field in a reflected binary code. The virtue of reflected binary or Gray code is that the track identity from track to track changes by only one bit. This permits off-track reading of the TID field. The property of changing just one bit between tracks when using the Gray code has, prior to the instant invention, precluded protecting the TID and other information in the servo field with ECC.

Figure 5:
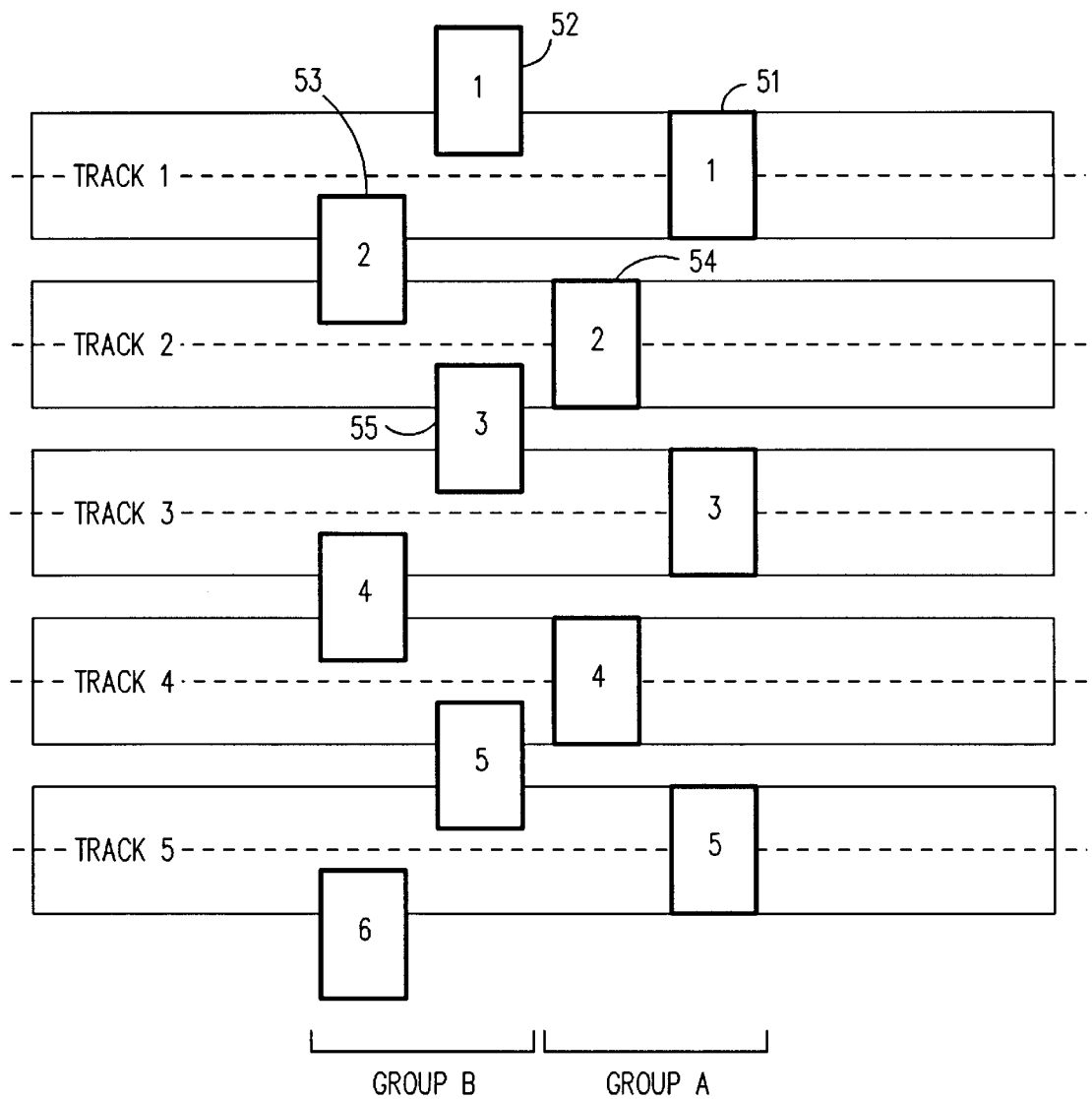
FIG. 5 illustrates the positions of the PES bursts in relation to the data track centerlines and track ID content of each burst on a disk in an embodiment of the invention.

FIG. 5 illustrates the relative positions of the PES fields, which are often called "bursts," with regard to each other and the centerlines of the tracks in an embodiment of the invention. The terms "field, "signal" and "burst" will be used interchangeably to refer to a PES unit. Tracks 1–5 are shown as extending horizontally across the figure with their corresponding PES bursts. The head will be assumed to be traveling from left to right as FIG. 5 is drawn The PES bursts are shown as being approximately as wide as the tracks, but the precise width and positioning are not critical for practicing the invention. Some of the bursts are placed on the centerline of the track. These will be referred to a one group of bursts while the bursts which are offset from the centerlines will be referred to a second group. The PES burst 51 is centered on the centerline of track 1. PES burst 52 is offset from the centerline of track 1, i.e. above the centerline, so that less than only a portion of the width of burst 52 is over track 1. PES burst 53 is offset below the centerline of track 1, so that only a portion of the width of burst 53 is over track 1. PES burst 54 is centered on track 2. PES bursts 51–54 are also placed at different positions along the track so that the head following track will pass each of the burst at a different time. PES burst 53 will be passed first, PES burst 52 second, PES burst 54 third and PES burst 51 last. Thus, the PES bursts in FIG. 5 are arranged in four distinct time positions when the disk is rotating under the head. Interchangeably the four PES groups will be described as falling into four radial positions. The groups of four PES bursts will be repeated multiple times around the disk as shown in FIG. 1 and will be repeated for each pair of concentric tracks as in the prior art. The order of the bursts is not critical for the invention. For example, the centerline bursts 51, 54, etc. (Group A) could be placed ahead of the offset bursts 52, 53, 55, etc. (Group B). The system can use the relative signal strength of the waveform induced in the read head from each of the four bursts to judge where the head is in relation to the centerline as per the prior art, since as will be described below, the analog characteristics of bursts are kept essentially constant despite having information encoded in them.

The inventions described herein allow information, including track ID information, to be stored in the PES fields. Continuing to reference FIG. 5, in the embodiment of the invention shown, the track ID for track 1 is recorded in both PES bursts 52 and 51. Similarly, the track ID for track 2 is recorded in both PES bursts 53 and 54. When a head is either seeking or track following, the relative signal strength at the head from the bursts will vary. It is to be expected that it will be more difficult to read the information recorded in bursts as the signal strength at the head decreases. Since the burst are arrayed in an overlapping pattern, the head will be able to read at least one and perhaps more of the track ID fields.

In the following example it will be assumed that a head following a track will typically be able to read the information in the three nearest bursts, but this is not required for the invention to be successfully employed as will be seen. A head following track 1 in FIG. 5 will pass burst 53 and read track ID 2, then pass burst 52 and read track ID 1, and will then pass over burst 51 and read track ID 1. If these IDs are concatenated, they are "211." A head following track 2 will pass burst 53 and read track ID 2, then pass burst 55 and read track ID 3, and will then pass over burst 54 and read track ID 2. If these IDs are concatenated, they are "232." This pattern will be repeated for each pair of tracks making an even/odd track distinction. Thus, the track 1 ID sequence is "n+1, n, n" while the track 2 sequence is "n, n+1, n." In either case the servo system can determine which track it is following despite having read two different track ID's.

If the system is unable to read the track ID in one or more of the bursts, position information can still be gleaned by knowing the timing of the burst(s) and the ID(s) encoded therein. For example, if the head is able to read only the track ID from burst 51 in the last time slot, the servo system will know that it has read the centerline burst for track 1. If only burst 52 has been read, the drive will know the track ID is 1 and that the burst to the left of track 1 was read. If only burst 53 has been read, the servo system will know the track ID is 2 and know that the burst overlaying track 1 and track 2 was read. Thus, combining the track ID with knowledge of which timing slot the burst was read gives not only the track ID itself, but additional position information as well.

The technique for recording the track ID as well as any other information in the PES burst will now be illustrated by describing a specific embodiment of the invention. In FIG. 2A, the PES (Position Error Signal) field of 64 bits is the largest. The 64 bit field should be thought of as space reserved for the PES bursts, since only a subportion, i.e, one burst will be aligned with the track and the rest will either be absent or offset from the track centerline as is illustrated in FIG. 5. The prior art bursts, of which there are two, three or four, are essentially a group of uniformly spaced magnetic transitions which can be thought of as a sequence of recorded 1's. The two, three or four bursts are identical except for their position. It is noted that this prior art servo sector format would typically be written phase-aligned track to track at a nominal 20 MHz rate.

Figure 2B:
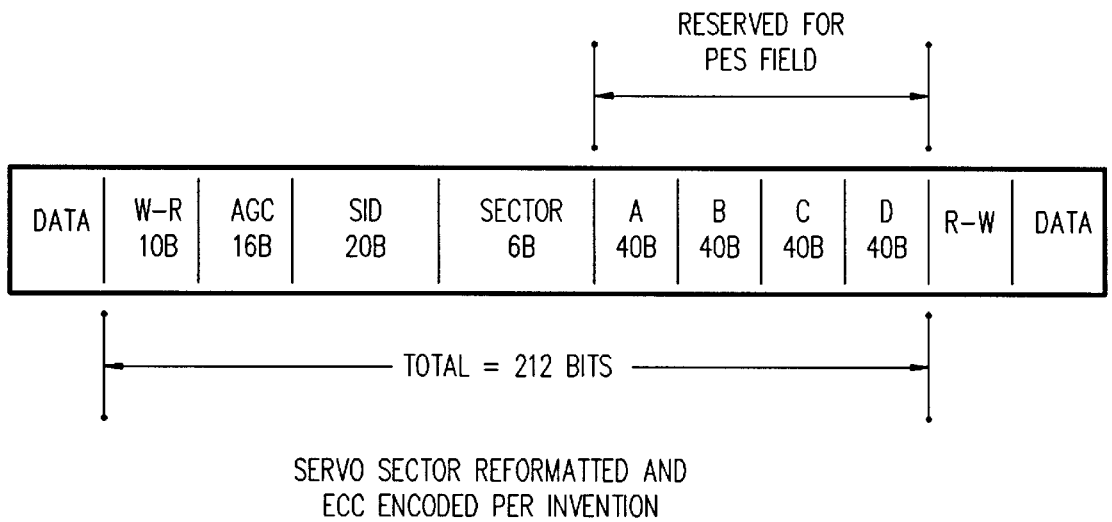
FIG. 2B illustrates a servo sector reformatted with field designations and bit lengths according to the invention.

FIG. 2B shows an embodiment of a servo sector formatted with field designations and bit lengths according to the invention. It should be noted that the servo sector is larger, consisting of 212 bits in length. However, the improved error tolerance permits recording information in higher bit densities so less total disk space is used. Also, there are several substantive changes. The ECC for the PES described below is not to be confused with the standard ECC which is used to protect the customer data. The customer data ECC is not effected in anyway in a drive using the PES ECC of the invention.

At the initial, lowest level magnetic transitions in the PES signals are translated into binary data bits. In FIG. 7 the unit which takes the waveform from the read head and performs this function is shown as the PES data detector 31. The bits of information can be encoded in the PES in several ways and the chosen method has no necessary relationship to the scheme used for the customer data. The following are examples of prior art ways to record the bits, but are not intended to be an exhaustive list. A bit can be mapped as one "data" bit to one flux transition, in which case the presence of a flux transition at a particular time is a one and its absence a zero. This provides the most compact scheme of encoding. For example, let "+" be a positive flux transition, "−" a negative transition, and "0" no transition, then "1101" becomes "+−0+". A bit can be mapped as one "data" bit to a pair of flux transitions (dibit); again the presence of a dibit is a one and its absence is a zero. This is less compact, but dibits are often easier to detect than single bits because of channel filtering. In this case, "1101" becomes "+−+−00+−", twice as long as the first example. The "data" bit can be encoded using three clocking periods, the first of which has a flux transition (for clocking/run length limiting) and the second or third contains a second flux transition depending on whether the "data" is a one or zero. In this case "1101" becomes "+−0+−0+0−+−0". This particular scheme is not especially advantageous for use with a code that provides run length limiting.

It is also possible to use the scheme proposed by Cunningham in the previously cited publication. If the data is phase encoded, using the same notation as above a 1 becomes "0+00" or "0−00" and a "0" becomes "00+0" or "00−0". This is useful when the bit frequency is substantially lower than the demodulator's clock.

Given a scheme to record and decode binary data in the PES, the actual information content and ECC of the PES can be designed. In the described embodiment the servo data is mapped into an ECC codeword for any given track by assigning an m*n bit string to the TID and partitioning the m*n bit string into m bytes of length n bits each. Next, r redundant bytes of n bits each are formed as the residue of an ECC encoding process over the m*n bit string. After determining the r redundant bytes, each n bit byte for any given (m*n+r*n) bit string is mapped into an (n+q) bit vector of weight j. Codewords in the ECC code are formed by concatenating the $2^n$ vectors in a predetermined order. Finally, each codeword is written as signal bursts of 1's and 0's into the PES positions of the formatted servo field.

For example, if the parameters m, n, r, q, and j assume the values of m=6 bytes, n=3 bits per byte, r=2 redundant bytes, (n+q)=5 bits, j=3, then m(n+q)+r(n+q)=40 bits per codeword, and codeword weight=(m+r)j=24. if the TID is a string of m*n=18 bits, firstly, the string will be blocked into m=6 bytes of n=3 bits per byte. Secondly, r=2 redundant bytes of n=3 bits each are derived as a residue of a Reed-Solomon or Hamming ECC encoding operation over the m*n=18 bit string. Thirdly, each n=3 bit byte for any given string of (m en+r*n)=24 bits=8 bytes is mapped into an (n+q)=5 bit vector of weight j=3. The mapping excludes vectors having runs of j leading or trailing 1's, such as 11100 and 00111. A codeword in an ECC code as used in this invention is a concatenation of the $2^n$=8 vectors of 5 bits each. This constitutes a 40-bit codeword in the ECC code. This codeword is written into one or more of the PES fields. Each codeword thus exhibits a predetermined minimum weight and run-length-limited attributes.

In this embodiment of the invention for a 40 bit codeword, the code of choice is a [40,18,6] constant weight 24 code. Other codes are equally possible depending of the length of the TID field, the degree of protection desired, etc. The example code has a length 40, a dimension 18, a minimum distance 6, a constant weight 24, and a maximum run of 0's of 2. The dimension 18 is the bit length of the data to be encoded. The length 40 is the number of bits in each codeword. The weight 24 is the number of 1's in each codeword. The constant weight of the code allows the burst signals detected by the head to be integrated and used as in the prior art, since each burst will have 24 bits which are 1's and 16 bits which are 0's in varying positions.

As mentioned previously, the track identity TID in this embodiment is represented by a string of 18 bits. This TID string is partitioned into six 3-bit symbols. Each symbol is an element in a Galois field GF (8) as generated by a primitive polynomial, e.g. $(1+x^2+x^3)$. To the six information symbols, two redundant symbols are added using the parity check matrix:

$$H = \begin{matrix} 1 & 1 & 1 & 1 & 1 & 1 & 1 & 0 \\ 1 & a & a^2 & a^3 & a^4 & a^5 & 0 & 1 \end{matrix}$$

The finite field GF(8) defined by $1+x^2+x^3$ can be written according to Table 1 as follows:

TABLE 1

| Value of "α" | Power of "α" |
| --- | --- |
| 000 | 0 |
| 100 | 1 |
| 010 | α |
| 001 | $\alpha^2$ |
| 101 | $\alpha^3$ |
| 111 | $\alpha^4$ |
| 110 | $\alpha^5$ |
| 011 | $\alpha^6$ |

Next, each 3-bit symbol is transformed into a 5-bit symbol (bit-vector) or codeword of weight 3 according to Table 2 as follows:

TABLE 2

| 3-bit symbol X | 5-bit symbol Vector Y = f(X) |
| --- | --- |
| 000 | 10110 |
| 001 | 11010 |
| 010 | 11001 |
| 011 | 10101 |
| 100 | 10011 |

TABLE 2-continued

| 3-bit symbol X | 5-bit symbol Vector Y = f(X) |
|---|---|
| 101 | 01110 |
| 110 | 01101 |
| 111 | 01011 |

Assume that it is desired to encode the 18-bit string u in the form of six 3-bit bytes:

Let u=011 000 100 010 010 110.

If the bytes in u are written as powers of "a" according to Table 1, then $u=(a^6, 0,1, a,a,a^5)$.

Encoding u using the parity check matrix H, then two redundant bytes are added to u as follows:

$v=(a^6, 0,1, a,a,a^5,a^2,a^5)$=011 000 100 010 010 110 001 110.

Finally, each of the eight 3-bit symbols of "v" is mapped into a 5-bit vector of weight 3 according to Table 2 to obtain the final constrained RS codeword "w":

w=10101 10110 10011 11001 11001 01101 11010 01101.

Aspects of Decoding According to the Invention

The embodiment example used for encoding will be used to illustrate data decoding according to the invention. After the binary codeword has been read back from the PES field(s) the first step partitions the codeword into the 5-bit vectors Y which are then mapped into a 3-bit symbols X according to Table 2. Thus, $f^{-1}(Y)=X$ denotes this mapping. However, it may happen that due to errors in a particular 5-bit vector, there is no counterpart 3-bit symbol. In this case, if Y is not in the table, then the value "000" is assigned to $f^{-1}(Y)$ and at the same time the symbol is flagged as being in error, i.e. a corresponding error flag is set.

Assume that a word W of length 40 is read back from the PES field of the servo sector from a particular track. In the above notation, these would be $(Y_0\ Y_1\ Y_2\ Y_3\ Y_4\ Y_5\ Y_6\ Y_7)$, where each $Y_i$ is a 5-bit vector. The next step in decoding is looking up each vector Y in the table and counting the number of error flags. This is termed estimating the value $R^{(i)}$ of each vector $Y_i$ and is denoted by $R^{(i)}=f^{-1}(Y_i)$ lying in the range $(0 \leq i \leq 7)$.

Since the codewords in this embodiment have a minimum distance of six from each other, this means that the code can correct up to two errors and detect up to three errors. If three or more flags have been counted or set, then at least three errors have occurred and the vector is uncorrectable. However, if less than three flags have been counted, then the error, if any, may be correctable. If zero flags are counted there is still a possibility that errors exist. If there are two or less flags, the next step is to derive the syndromes S from the eight symbols $R^{(i)}$ utilizing the parity check matrix H:

$S^0=R^{(0)} \oplus R^{(1)} \oplus R^{(2)} \oplus R^{(3)} \oplus R^{(4)} \oplus R^{(5)} \oplus R^{(6)} S_1 = R^{(0)} \oplus aR^{(1)} \oplus a^2R^{(2)} \oplus a^3R^{(3)} \oplus a^4R^{(4)} \oplus a^5R^{(5)} \oplus R^{(7)}$ The remaining part of the analysis is standard syndrome interpretation of RS codewords in three modes; namely, no flags, one flag, or two flags.

Figure 3:
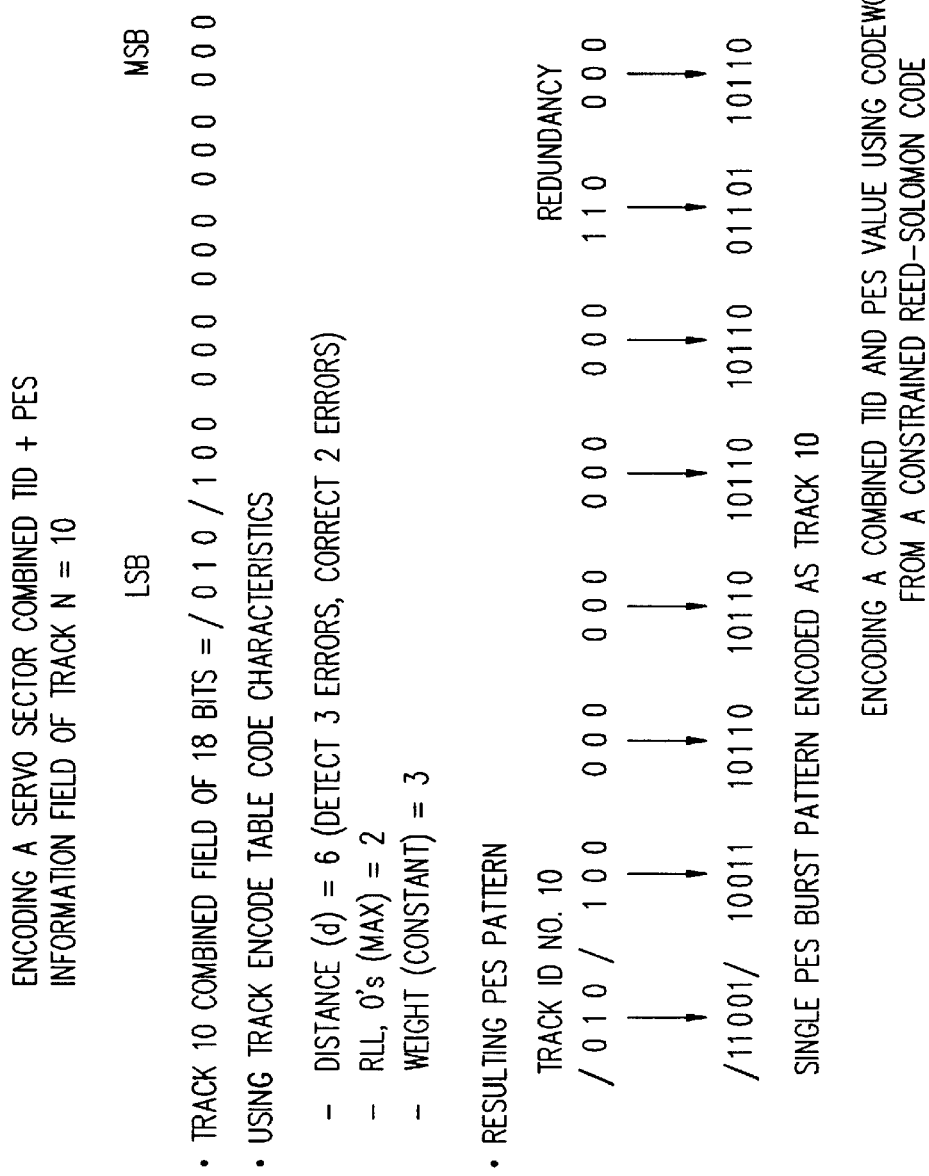
FIG. 3 depicts an example according to the invention of encoding combined TID and PES values utilizing a constrained Reed-Solomon error correction code according to the invention.

Referring now to FIG. 3, there is shown a visual example according to the invention of encoding a TID utilizing a constrained RS error correction code and writing the codeword into PES fields. Thus, the codeword is utilized for both track identification and position error signal purposes, and in that sense serves a combined function. In this example, the TID for track 10 is represented by an 18-bit sequence. The 18-bit sequence is in turn parsed to form six 3-bit symbols. Two redundant 3-bit symbols are added using an extended [8,6] Reed-Solomon code as defined by parity check matrix H. The six symbols plus the two redundant symbols are each in turn mapped into counterpart 5-bit vectors of the [8,6] constrained Reed-Solomon code. As mentioned before, concatenation of the eight vectors in a predetermined order forms a codeword suitable for recording in the PES fields.

Figure 4:
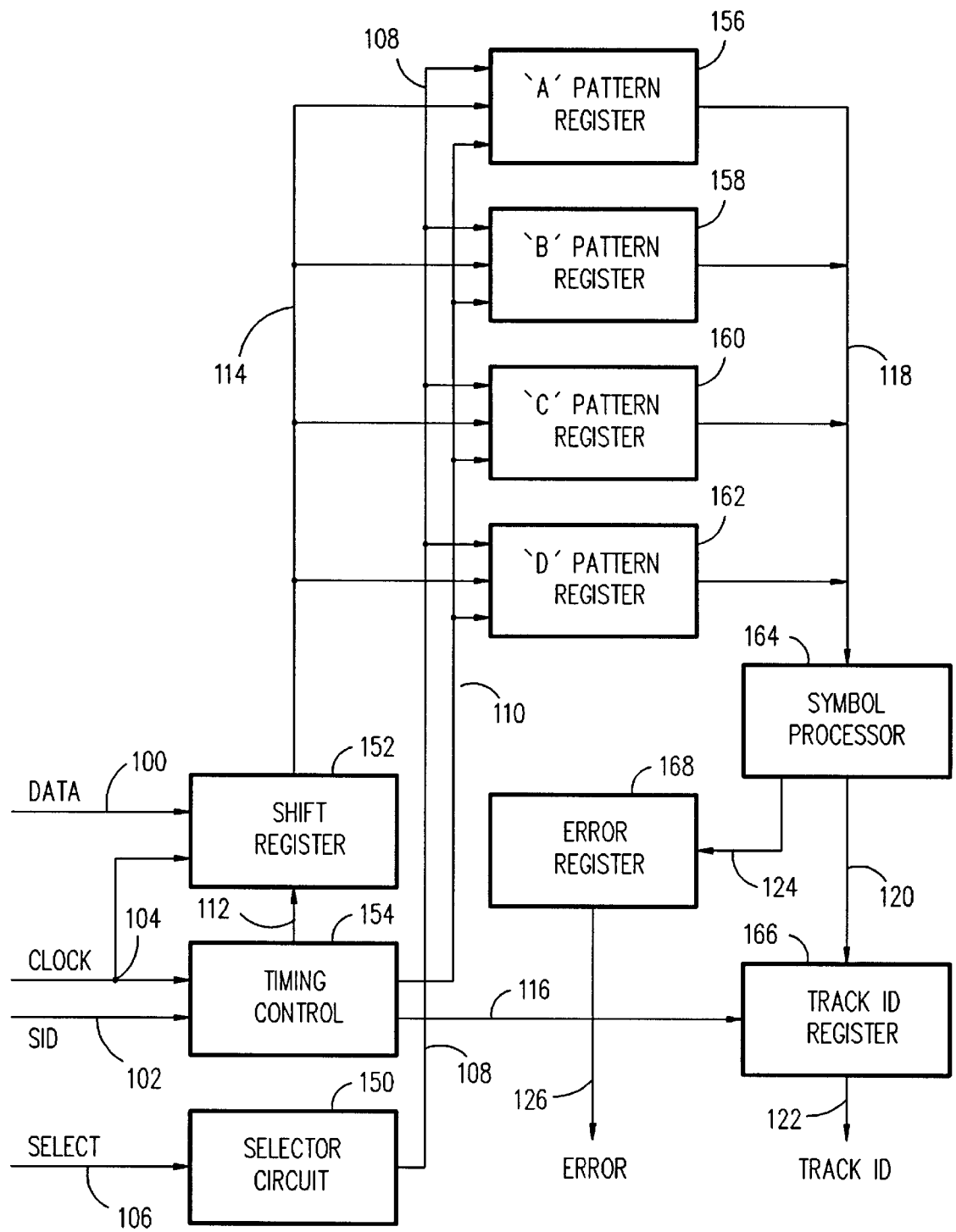
FIG. 4 illustrates the logic processing blocks in a PES data processor according to an embodiment of the invention.

Referring now to FIG. 4, there is shown an embodiment of a PES data processor. The apparatus shown in FIG. 4 is conceptually part of the servo electronics (FIG. 1, 112). It includes four pattern registers 156, 158, 160, 162 and an arrangement of timing 154 and selector circuits 150 responsive to the standard SID 102, SELECT 106 and CLOCK 104 signals. The PES data detector 31 converts the magnetic transitions in the PES fields into data bits which flow on data path 100 into a shift register 152. The shift register synchronously transfers RS-coded patterns on path 114 received on the data path 100 using clock 104 and select line 110 to the selected one of a plurality of pattern registers 156, 158, 160, 162. The selector line 110 from the selector 150 to the pattern registers comprises at least two bits to allow selection of any one of the four pattern registers. A symbol processor 164, inputs the selected output from one of the pattern registers over a connecting path 118, then performs the bit-vector to symbol mapping and the RS detection and correction on codewords in the selected pattern. Further, the symbol processor 164 corrects any errors in the patterns up to the capacity of the code and writes the corrected TID on path 120 into a register 166 and the error flags 124 (or number of errors) to register 168 on path 124 at a time determined by the output of the control register 154 using signal 116. The TID register 166 and error register 168 are then available for use by the servo system over paths 122 and 126 respectively.

The track ID decode process begins with the servo ID (SID) timing signal on path 102 initializing timing control circuitry 154. A gate signal on path 112 from the timing circuit 154 controls the flow of RS codewords on path 100 into a shift register as paced by clocking on path 104. The RS codewords are then stored in the pattern registers 156, 158, 160, 162 as clocked by timing signals on path 110 from timing circuit 154. Since the four different groups of PES bursts are distinguishable by their radial positions on the disk in relation to the SID, they are also distinguishable by the time that they pass by the read head as the disk rotates.

Following the capture and storage of the RS codewords in the registers, the servo electronics will select one of the four RS codeword patterns corresponding to one of the four PES burst groups. A 2-bit PES pattern selection signal on path 106 is supplied to circuit 150. In turn, circuit 150 activates one of the four select lines 108 to enable output of one of the pattern registers 156, 158, 160, 162. The pattern register RS codeword contents are applied to symbol processor 164 over path 118 where its syndromes will be derived and any errors determined from the syndromes. Errors within the power of the code will be corrected and reported in error register 168. This will be accompanied by an indication of the number of errors. Otherwise, the TID will be stored in register 166.

Figure 6:
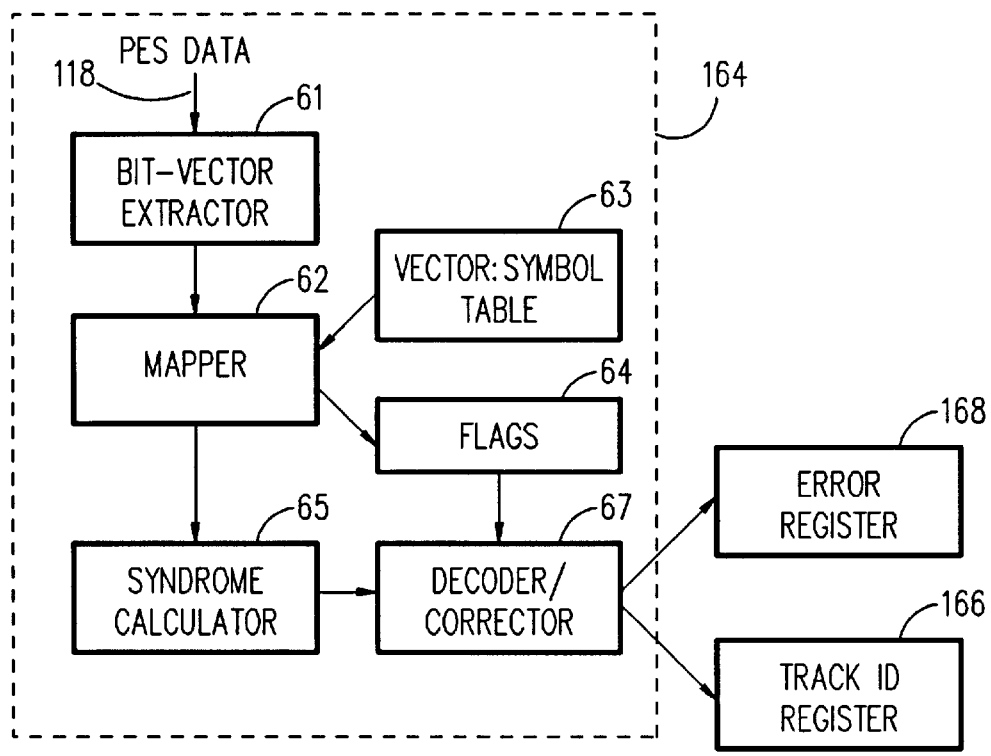
FIG. 6 is a block diagram of a PES data processor according to an embodiment of the invention.

FIG. 6 is a block diagram of a symbol processor 164 according to the described embodiment of the invention. The raw data from a selected one of the PES pattern registers comes into the bit-vector extractor 61 which partitions the bits into the bit-vectors, e.g. 40 raw bits into 8 vectors of 5 bits each. The bit-vectors are passed to the mapper 62 which maps the 5-bit vectors using the vector:symbol table 63 into the corresponding 3-bit symbols for all 5-bit vectors not containing errors (symbol "000" is used for the vector having errors). One of the error flags 64 is set or a counter is incremented for each 5-bit vector not found in the vector:symbol table 63. The 3-bit symbols are passed to the syndrome calculator 65. The syndromes are passed to the decoder/corrector 67 which uses the syndromes to detect and correct errors up to the code capability and place the corrected symbols in the track ID register 166. The decoder/corrector 67 has access to the flags 64. If there are no flags (i.e., error count is equal to zero) and the syndromes are zero, then the 3-bit symbols are placed unchanged into the track ID register 166. The final error status is updated in error register 168 as previously indicated.

Figure 8:
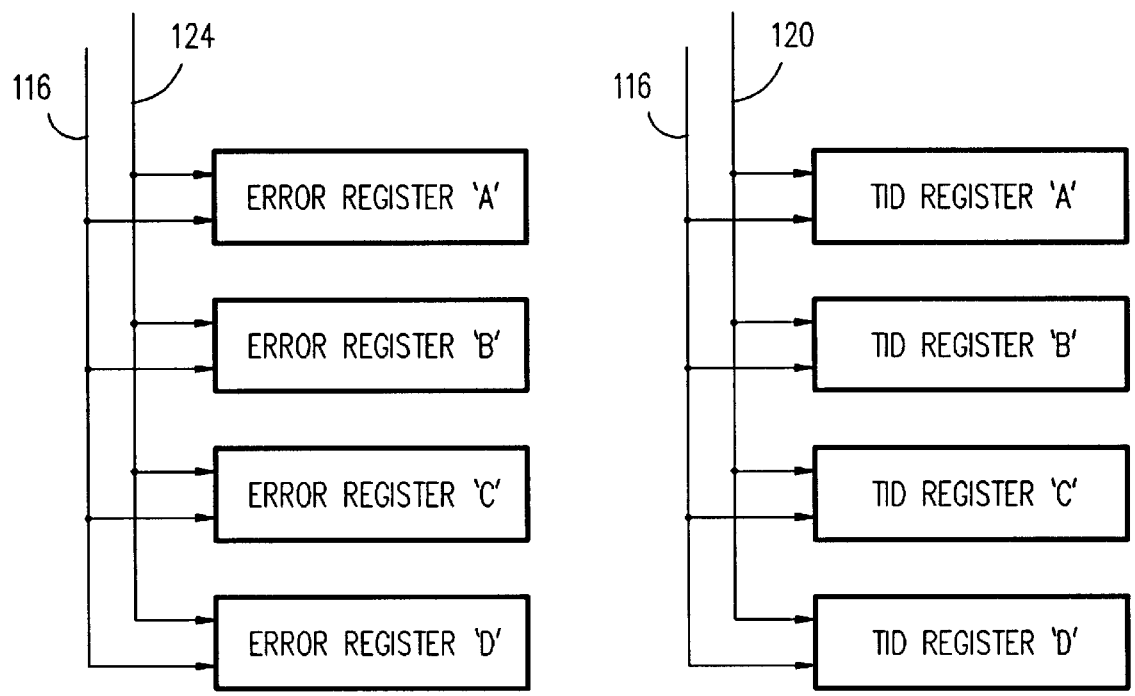
FIG. 8 illustrates the error registers and track ID registers in a second embodiment of the invention.

A second embodiment of the invention uses four error registers (A–D) and four track ID registers (A–D), as illustrated in FIG. 8, which replace the single error register and single track ID register in the embodiment shown in FIG. 4. Given sufficiently fast circuitry and/or processing speed, the symbol processor could attempt to resolve the track ID and other information in all four PES burst groups and store each result in a corresponding track ID register. The output 116 of the timing control circuit 154 of FIG. 4 could be used in conjunction with selector circuit output 108 (not shown in FIG. 8) to process and store the information from each of the four PES bursts (A,B,C,D) in the corresponding track ID register (A–D). Similarly in this embodiment there are four corresponding error registers (A–D) which are selected to store the error status for each of the four bursts. Note that it is not necessary that all four PES bursts be successfully read for a particular position. Preferably each of the track ID registers and the error registers would be made available for reading by a servo processor. Given the method of recording the track ID's in the PES fields shown in FIG. 5, multiple track ID registers would allow easy comparison of the ID's from each field so that the maximum information about the position would be passed to the servo processor.

While the invention has been described with respect to an illustrative embodiment thereof, it will be understood that various changes may be made in the method and means herein described without departing from the scope and teaching of the invention. Accordingly, the described embodiment is to be considered merely exemplary and the invention is not to be limited except as specified in the attached claims.

What is claimed is:

1. A data storage disk comprising:
a substrate;
a magnetic recording medium deposited on the substrate; and
a plurality of position error signals recorded on the magnetic recording medium, the position error signals having at least first and second groups with the first group of position error signals being angularly offset from the second group of position error signals, the first group being positioned on a centerline of a track and the second group being offset from the centerline of the track, each position error signal (PES) being a set of magnetic transitions, each set of magnetic transitions representing binary data which is a function of a track number where the PES is located, the binary data including redundancy bits which provide a first error detecting scheme for reading errors, the binary data being further composed of a plurality of bit-vectors which correspond to symbols having fewer bits than the bit-vectors which creates a mapping providing a second error detecting scheme.

2. The data storage disk of claim 1 wherein the binary data in first and second groups of PES includes the track number on which the first group of PES is centered.

3. The data storage disk of claim 2 further comprising third and fourth groups of position error signals which are angularly offset from each other and from the first and second groups of position error signals, the first group of PES being located on the centerline of alternating tracks while the third group of PES is located on the centerline of tracks located between the alternating tracks and the fourth group of PES is offset from the centerline of the third group of PES.

4. The data storage disk of claim 1 wherein the binary data in first and second groups of PES includes ECC check symbols.

5. The data storage disk of claim 1 wherein at least one symbol represents an ECC check symbol.

6. The data storage disk of claim 1 wherein the binary data in first and second groups of PES is composed of a plurality of n-bit vectors which map to a plurality of symbols having n−2 or less bits per symbol.

7. The data storage disk of claim 6 wherein the plurality of symbols form at least one codeword in an error correction code.

8. The data storage disk of claim 1 wherein each PES in the first group has an equal number of magnetic transitions.

9. The data storage disk of claim 8 wherein the binary data in first and second groups of PES includes the track number on which the first group of PES is centered.

10. The data storage disk of claim 9 further comprising third and fourth groups of position error signals which are angularly offset from each other and from the first and second groups of position error signals, the first group of PES being located on the centerline of alternating tracks while the third group of PES is located on the centerline of tracks located between the alternating tracks and the fourth group of PES is offset from the centerline of the third group of PES.

11. A data storage disk comprising:
a substrate;
a magnetic recording medium deposited on the substrate; and
a plurality of position error signals recorded on the magnetic recording medium, the position error signals having at least first, second, third and fourth groups with each group of position error signal (PES) having a uniquely identifying angular offset from a servo index marker, the first and third groups of PES being respectively positioned on centerlines of alternate tracks and the second and fourth groups of PES being offset from centerlines of the tracks, each PES being a set of magnetic transitions, each set of magnetic transitions representing binary data which is a function of a concentric track number where the PES is located, the binary data including redundancy bits for detecting reading errors, the binary data being further composed of a plurality of n-bit vectors which map to a plurality of symbols having n−1 or less bits per symbol, the binary data for the first and second PES groups containing information which identifies the track on which the first PES group is centered and the binary data for the third and fourth PES groups containing information which identifies the track on which the third PES group is centered.

12. The data storage disk of claim 11 wherein the plurality of symbols form at least one codeword in an error correction code.

13. The data storage disk of claim 11 wherein the binary data forms at least one codeword in an error correction code.

14. A method of making a data storage disk having a magnetic recording medium comprising the steps of:

encoding a track identifier n in a first codeword which includes redundancy bits;

dividing the first codeword into a first set of one or more symbols;

mapping the first set of one or more symbols into a set of bit-vectors having more bits per vector than the number of bits in a symbol; and writing the the bit-vectors in a plurality of position error signals at selected radial positions on the magnetic recording medium.

15. The method of claim 14, wherein the bit vectors have equal weight.

16. The method of claim 14, the encoding steps further comprising the steps of:

calculating error correction code checkbytes; and including the checkbytes in the codeword.

* * * * *